United States Patent
Muroya et al.

(10) Patent No.: US 10,873,068 B2
(45) Date of Patent: Dec. 22, 2020

(54) SECONDARY BATTERY AND METHOD FOR MANUFACTURING THE SAME

(71) Applicant: SANYO Electric Co., Ltd., Daito (JP)

(72) Inventors: Yohei Muroya, Hyogo (JP); Hiroyuki Inoue, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 167 days.

(21) Appl. No.: 16/142,454

(22) Filed: Sep. 26, 2018

(65) Prior Publication Data
US 2019/0103596 A1 Apr. 4, 2019

(30) Foreign Application Priority Data
Sep. 29, 2017 (JP) .................. 2017-189365

(51) Int. Cl.
*H01M 2/26* (2006.01)
*H01M 2/06* (2006.01)
*H01M 2/08* (2006.01)
*H01M 2/22* (2006.01)
*H01M 2/04* (2006.01)
*H01M 2/30* (2006.01)
*H01M 10/04* (2006.01)

(52) U.S. Cl.
CPC ............ *H01M 2/26* (2013.01); *H01M 2/043* (2013.01); *H01M 2/06* (2013.01); *H01M 2/08* (2013.01); *H01M 2/22* (2013.01); *H01M 2/263* (2013.01); *H01M 2/30* (2013.01); *H01M 10/0413* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2006/0024573 | A1* | 2/2006 | Yim | H01M 2/361 429/174 |
| 2008/0160393 | A1* | 7/2008 | Kim | H01M 2/361 429/94 |
| 2010/0279156 | A1 | 11/2010 | Kim et al. | |
| 2012/0052373 | A1* | 3/2012 | Kim | H01M 2/06 429/179 |
| 2012/0058374 | A1* | 3/2012 | Aota | H01M 10/0431 429/94 |

(Continued)

FOREIGN PATENT DOCUMENTS

JP  2011-18645 A  1/2011
JP  2016-201348 A  12/2016

*Primary Examiner* — Rena Dye Cronin
(74) *Attorney, Agent, or Firm* — Westerman, Hattori, Daniels & Adrian, LLP

(57) ABSTRACT

A secondary battery includes an electrode body that includes a positive-electrode sheet and a negative-electrode sheet, a prismatic exterior body that accommodates the electrode body, a metallic sealing plate that seals an opening of the prismatic exterior body, and a positive-electrode current collector that is electrically connected to the positive-electrode sheet and the sealing plate. The positive-electrode current collector includes a base that faces the sealing plate and a lead that is disposed on an end portion of the base. A projection is formed on the sealing plate. The projection is fitted in a connection opening that is formed in the base. The projection and the base are welded to each other.

12 Claims, 14 Drawing Sheets

(56) References Cited

U.S. PATENT DOCUMENTS

2015/0364732 A1* 12/2015 Kim .................... H01M 2/0277
                                                    429/179
2016/0293929 A1* 10/2016 Kitaoka ................ H01M 2/024
2016/0301041 A1   10/2016 Kim et al.
2018/0351140 A1* 12/2018 Muroya ................ H01M 4/661

* cited by examiner

SECONDARY BATTERY AND METHOD FOR MANUFACTURING THE SAME

CROSS REFERENCE TO RELATED APPLICATIONS

The present invention application claims priority to Japanese Patent Application No. 2017-189365 filed in the Japan Patent Office on Sep. 29, 2017, the entire contents of which are incorporated herein by reference.

BACKGROUND OF THE INVENTION

Field of the Invention

The present invention relates to a secondary battery and a method for manufacturing the secondary battery.

Description of Related Art

Prismatic secondary batteries such as alkali secondary batteries and non-aqueous electrolyte secondary batteries are used in power sources for driving, for example, electric vehicles (EVs) and hybrid electric vehicles (HEVs or PHEVs).

Each of the prismatic secondary batteries includes a battery case formed of a prismatic exterior body in the form of a tube having an opening and a bottom and a sealing plate that seals the opening of the exterior body. In the battery case, an electrode body and an electrolyte solution are accommodated, and the electrode body is formed of a positive-electrode sheet, a negative-electrode sheet, and a separator. A positive-electrode external terminal and a negative-electrode external terminal are secured to the sealing plate with insulating members interposed therebetween. The positive-electrode external terminal is electrically connected to the positive-electrode sheet with a positive-electrode current collector interposed therebetween. The negative-electrode external terminal is electrically connected to the negative-electrode sheet with a negative-electrode current collector interposed therebetween.

In a proposed prismatic secondary battery as disposed in Japanese Published Unexamined Patent Application No. 2011-18645 (Patent Document 1), the positive-electrode current collector is connected to a surface of the sealing plate on the inner side of the battery, and the battery case doubles as the positive-electrode external terminal.

This structure has an advantage such as a decrease in the number of components. However, a method for connecting the positive-electrode current collector and the sealing plate to each other is not fully considered.

BRIEF SUMMARY OF THE INVENTION

In a prismatic secondary battery that is used, for example, in a power source for driving a vehicle such as an electric vehicle or a hybrid electric vehicle, a conductive path from the electrode body to the outside of the battery is required to be unlikely to damage and break even when the prismatic secondary battery is strongly impacted or vibrated.

It is an object of the present invention to provide a secondary battery that has increased reliability, and a method for manufacturing the secondary battery.

A secondary battery according to an embodiment of the present invention includes an electrode body that includes a first electrode sheet and a second electrode sheet having a polarity different from a polarity of the first electrode sheet, an exterior body that has an opening and that accommodates the electrode body, a sealing plate that seals the opening, and a current collector that is electrically connected to the first electrode sheet. The current collector includes a base that faces the sealing plate. A projection is formed on a surface of the sealing plate on an electrode body side. A connection opening or a connection notch is formed in the base. The projection is fitted in the connection opening or the connection notch. The projection and the base are welded to each other, and a weld nugget is formed.

In the secondary battery according to the embodiment of the present invention, the projection that is formed on the sealing plate is fitted in the connection opening or the connection notch that is formed in the current collector, and the projection that is formed on the sealing plate and the base are welded to each other. Accordingly, the sealing plate and the current collector are firmly connected to each other, and a contact between the sealing plate and the current collector has high reliability.

In the secondary battery according to the embodiment of the present invention, the current collector can include a lead that extends from an end portion of the base to the electrode body. A part of a boundary portion between the projection and the base that is nearest to a boundary between the base and the lead can contain a region in which a density of the weld nugget is higher than that in the other region of the boundary portion.

When the secondary battery is strongly impacted or vibrated, the current collector is pulled by the electrode body, and a high load is applied to the part of the boundary portion between the projection and the base that is nearest to the boundary between the base and the lead. In the case where the part of the boundary portion between the projection and the base that is nearest to the boundary between the base and the lead contains the region in which the density of the weld nugget is higher than that in the other region, a portion that is most likely to be subjected to a load is more firmly connected. Accordingly, the reliability of the contact between the sealing plate and the current collector increases. At a part of the boundary portion between the projection and the base that is relatively unconducive to the reliability of the contact between the sealing plate and the current collector, the density of the weld nugget is decreased, and accordingly, metal spatters are inhibited from being produced when the weld nugget is formed. Consequently, the reliability of the secondary battery increases. There is a possibility that metal spatters that adhere to components become foreign metals and cause an internal short circuit. Accordingly, the metal spatters are preferably inhibited from being produced.

The secondary battery according to the embodiment of the present invention can be a prismatic secondary battery. The lead can be disposed on the end portion of the base in a transverse direction of the sealing plate, and the boundary portion can contain a region that extends along the boundary between the base and the lead. The region that extends along the boundary between the base and the lead can contain the region in which the density of the weld nugget is higher than that in the other region of the boundary portion. With this structure, the secondary battery can be more readily manufactured.

The region that extends along the boundary between the base and the lead preferably extends linearly. With this structure, a load is inhibited from concentrating on one point, and the reliability of the secondary battery increases.

In the secondary battery according to the embodiment of the present invention, the connection opening can be formed in the base. The boundary portion can be oval in a plan view and include a first linear portion, a second linear portion, a first curved portion, and a second curved portion. The first linear portion can be located nearer than the second linear portion to the boundary between the base and the lead. The first linear portion can contain the region in which the density of the weld nugget is higher than that in the other region of the boundary portion. At the first linear portion, the density of the weld nugget can be higher than that at the first curved portion and the second curved portion. With this structure, the secondary battery has increased reliability of the contact between the sealing plate and the current collector.

The first linear portion and the second linear portion can extend in the longitudinal direction of the sealing plate.

The secondary battery according to the embodiment of the present invention can include tab portions that are disposed on the first electrode sheet. The tab portions can be stacked on and connected to the base. A part of the boundary portion between the projection and the base that is nearest to a contact between the base and the tab portions can contain a linear portion that extends along the contact between the base and the tab portions.

When the secondary battery is strongly impacted or vibrated, the current collector is pulled by the electrode body with the tab portions interposed therebetween, and a high load is applied to the part of the boundary portion between the projection and the base that is nearest to a contact between the base and the lead. In the case where the part of the boundary portion between the projection and the base that is nearest to the contact between the base and the tab portions contains the linear portion that extends along the contact between the base and the tab portions, a load is prevented from concentrating on one point, and the reliability of the secondary battery increases.

The secondary battery according to the embodiment of the present invention can include tab portions that are disposed on the first electrode sheet. The tab portions can be stacked on and connected to the base. A part of the boundary portion between the projection and the base that is nearest to a contact between the base and the tab portions can contain the region in which the density of the weld nugget is higher than that in the other region of the boundary portion. In the case where the part of the boundary portion between the projection and the base that is nearest to the contact between the base and the tab portions contains the region in which the density of the weld nugget is higher than that in the other region, a portion that is most likely to be subjected to a load is more firmly connected. Accordingly, the reliability of the contact between the sealing plate and the current collector increases. At the part of the boundary portion between the projection and the base that is relatively unconducive to the reliability of the contact between the sealing plate and the current collector, the density of the weld nugget is decreased, and accordingly, metal spatters are inhibited from being produced when the weld nugget is formed. Consequently, the reliability of the secondary battery increases.

A region of the boundary portion that extends along the contact between the base and the tab portions preferably contains the region in which the density of the weld nugget is higher than that in the other region of the boundary portion. This enables the secondary battery to have increased reliability of the contact between the sealing plate and the current collector.

A method according to an embodiment of the present invention for manufacturing a secondary battery is a method for manufacturing a secondary battery including an electrode body that includes a first electrode sheet and a second electrode sheet having a polarity different from a polarity of the first electrode sheet, an exterior body that has an opening and that accommodates the electrode body, a sealing plate that seals the opening, and a current collector that is electrically connected to the first electrode sheet, the current collector including a base that faces the sealing plate. The method includes a step of disposing a projection that is formed on the sealing plate in a connection opening or a connection notch that is formed in the base, and a step of welding the projection and the base to each other to form a weld nugget in a manner in which the projection and the base are irradiated with energy rays.

In the method according to the embodiment of the present invention for manufacturing the secondary battery, the projection that is formed on the sealing plate is fitted in the connection opening or the connection notch that is formed in the current collector, and the projection that is formed on the sealing plate and the base are welded to each other. Accordingly, the sealing plate and the current collector are firmly connected to each other, and the secondary battery has high reliability of the contact between the sealing plate and the current collector.

In the method according to the embodiment of the present invention for manufacturing the secondary battery, the current collector can include a lead that extends from an end portion of the base to the electrode body. In the step of welding, the protrusion and an edge portion around the connection opening or the connection notch can be welded to each other such that a part of a boundary portion between the projection and the base that is nearest to a boundary between the base and the lead contains a region in which a density of the weld nugget is higher than that in the other region of the boundary portion. In this case, the contact between the sealing plate and the current collector has high reliability, an internal short circuit is prevented from occurring with more certainty, and the secondary battery has increased reliability.

The secondary battery can be a prismatic secondary battery. The lead can be disposed on the end portion of the base in a transverse direction of the sealing plate, and the boundary portion can contain a region that extends along the boundary between the base and the lead. The region that extends along the boundary between the base and the lead can contain the region in which the density of the weld nugget is higher than that in the other region of the boundary portion. This enables the secondary battery to have increased reliability of the contact between the sealing plate and the current collector.

The method can include a step of folding the lead with respect to the base after the step of welding. This enables the secondary battery that has increased reliability to be more efficiently manufactured.

In the method according to the embodiment of the present invention for manufacturing the secondary battery, the secondary battery can include tab portions that are disposed on the first electrode sheet. The tab portions can be stacked on and connected to the base. A first tab group in which the tab portions are stacked and a second tab group in which tab portions are stacked can be connected to the base, and the first tab group and the second tab group can be curved in different directions. The step of welding can be performed after the first tab group and the second tab group are connected. The first tab group and the second tab group can be curved after the step of welding. This enables the secondary battery to have an increased volume energy density and high reliability.

The secondary battery can include tab portions that are disposed on the first electrode sheet. The tab portions can be stacked on and connected to the base. In the step of welding, the protrusion and the base can be welded to each other such that a part of the boundary portion between the projection and the base that is nearest to a contact between the base and the tab portions contains a region in which a density of the weld nugget is higher than that in the other region of the boundary portion.

In the case where the part of the boundary portion between the projection and the base that is nearest to the contact between the base and the tab portions contains the region in which the density of the weld nugget is higher than that in the other region, a portion that is most likely to be subjected to a load is more firmly connected. Accordingly, the reliability of the contact between the sealing plate and the current collector increases. At the part of the boundary portion between the projection and the base that is relatively unconducive to the reliability of the contact between the sealing plate and the current collector, the density of the weld nugget is decreased, and accordingly, metal spatters are inhibited from being produced when the weld nugget is formed. Consequently, the reliability of the secondary battery increases.

According to the present invention, the secondary battery has increased reliability.

DETAILED DESCRIPTION OF THE INVENTION

The structure of a prismatic secondary battery 20 according to a first embodiment will now be described. The present invention is not limited to the first embodiment described below.

Figure 1:
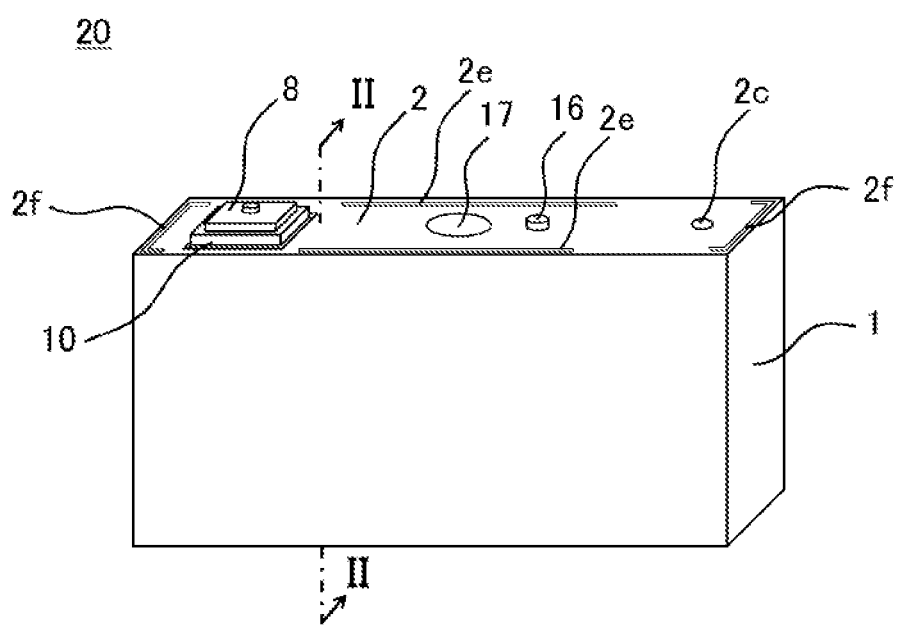
FIG. 1 is a perspective view of a prismatic secondary battery according to a first embodiment.
Figure 2:
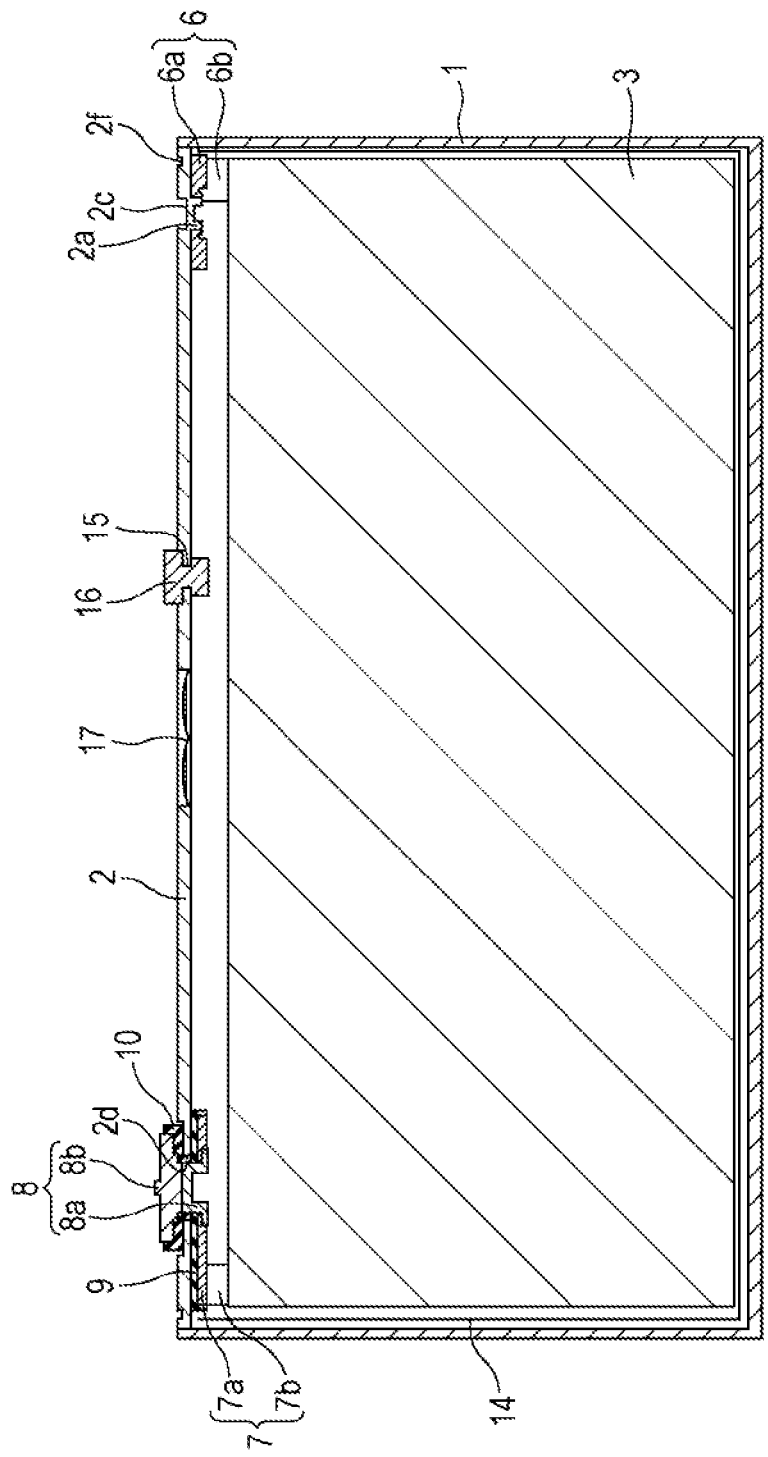
FIG. 2 is a sectional view of the secondary battery taken along line II-II in FIG. 1.

FIG. 1 is a perspective view of the prismatic secondary battery 20. FIG. 2 is a sectional view of the secondary battery taken along line II-II in FIG. 1. As illustrated in FIG. 1 and FIG. 2, the prismatic secondary battery 20 includes a battery case that is formed of a prismatic exterior body 1 in the form of a tube having an opening and a bottom and a sealing plate 2 that seals the opening of the prismatic exterior body 1. The prismatic exterior body 1 and the sealing plate 2 are preferably composed of a metal and are preferably composed of, for example, aluminum or an aluminum alloy. In the prismatic exterior body 1, an electrode body 3 and an electrolyte are accommodated, and the electrode body 3 is formed of a positive-electrode sheet and a negative-electrode sheet that are stacked or wound with a separator interposed therebetween. An insulation sheet 14 is disposed between the electrode body 3 and the prismatic exterior body 1.

A positive-electrode current collector 6 is connected to the positive-electrode sheet that is included in the electrode body 3. The positive-electrode current collector 6 is connected to the surface of the sealing plate 2 on the inner side of the battery. Thus, the positive-electrode sheet is electrically connected to the sealing plate 2 with the positive-electrode current collector 6 interposed therebetween. The positive-electrode current collector 6 is preferably composed of a metal and is preferably composed of aluminum or an aluminum alloy.

A negative-electrode current collector 7 is connected to the negative-electrode sheet that is included in the electrode body 3. The negative-electrode current collector 7 is connected to a negative-electrode external terminal 8. An inner insulating member 9 is disposed between the negative-electrode current collector 7 and the sealing plate 2. An outer insulating member 10 is disposed between the negative-electrode external terminal 8 and the sealing plate 2. Thus, the negative-electrode current collector 7 and the negative-electrode external terminal 8 are insulated from the sealing plate 2. The negative-electrode current collector 7 is preferably composed of a metal and is preferably composed of copper or a copper alloy. The inner insulating member 9 and the outer insulating member 10 are preferably composed of a resin. The negative-electrode external terminal 8 is preferably composed of a metal and is preferably composed of copper or a copper alloy. As illustrated in FIG. 2, the negative-electrode external terminal 8 is preferably formed of a first metal portion 8a that is disposed on the inner side of the battery and a second metal portion 8b that is disposed on the outer side of the battery. In this case, the first metal portion 8a is preferably composed of copper or a copper alloy. The second metal portion 8b is preferably composed of aluminum or an aluminum alloy. When an assembled battery is manufactured by using prismatic secondary batteries each having this structure, a bus-bar that is composed of aluminum or an aluminum alloy is preferably used to connect a positive-electrode external terminal of one of the prismatic secondary batteries and a negative-electrode external terminal of another prismatic secondary battery. A nickel layer is preferably formed on a surface of the first metal portion 8a.

A gas exhausting valve 17 is formed in the sealing plate 2. The gas exhausting valve 17 is broken when the pressure in the battery case becomes a certain pressure or more, and gas in the battery case is discharged therefrom to the outside of the battery case. The sealing plate 2 has an electrolytic solution injection hole 15. After an electrolytic solution is injected into the battery case, the electrolytic solution injection hole 15 is sealed by a sealing plug 16.

A method for manufacturing the prismatic secondary battery 20 will now be described. In the prismatic secondary battery 20 according to the first embodiment, the positive-electrode sheet is a first electrode sheet, and the negative-electrode sheet is a second electrode sheet.

Manufacture of Positive-Electrode Sheet

A positive-electrode mixture slurry containing a lithium-nickel-cobalt-manganese composite oxide as a positive electrode active material, a polyvinylidene fluoride (PVdF) as a binder, a carbon material as a conductive material, and N-methyl-2-pyrrolidone (NMP) as a dispersion medium is prepared. The positive-electrode mixture slurry is applied to both surfaces of an elongated aluminum foil having a thickness of 15 μm that is used as a positive-electrode core.

The NMP in the positive-electrode mixture slurry is removed by drying, and a positive electrode active material layer is formed on the positive-electrode core. Subsequently, the positive electrode active material layer is compressed to have a predetermined thickness and cut into a predetermined shape. The positive-electrode sheet thus obtained includes an exposed positive-electrode core portion 4 along an end portion of the elongated positive-electrode core in the width direction, and there are no positive electrode active material mixture layers on both surfaces thereof extending in the longitudinal direction of the positive-electrode core.

Manufacture of Negative-Electrode Sheet

A negative-electrode mixture slurry containing graphite as a negative electrode active material, styrene-butadiene rubber (SBR) as a binder, carboxymethyl cellulose (CMC) as a thickener, and water as a dispersion medium is prepared. The negative-electrode mixture slurry is applied to both surfaces of an elongated copper foil having a thickness of 8 μm that is used as a negative-electrode core. The water in the negative-electrode mixture slurry is removed by drying, and a negative electrode active material layer is formed on the negative-electrode core. Subsequently, the negative electrode active material layer is compressed to have a predetermined thickness and cut into a predetermined shape. The negative-electrode sheet thus obtained includes an exposed negative-electrode core portion 5 along an end portion of the elongated negative-electrode core in the width direction, and there are no negative electrode active material mixture layers on both surfaces thereof extending in the longitudinal direction of the negative-electrode core.

Manufacture of Electrode Body

Figure 3:
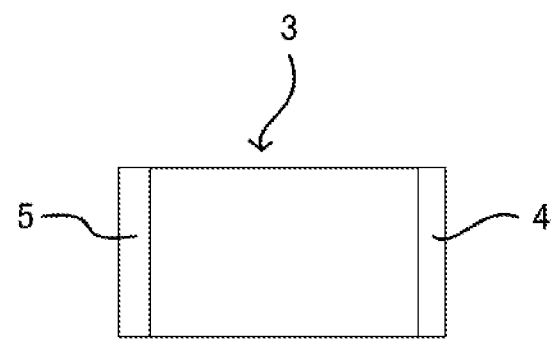
FIG. 3 is a front view of an electrode body according to the first embodiment.

The electrode body 3 that is wound is manufactured in a manner in which the positive-electrode sheet and the negative-electrode sheet manufactured in the above manner are wound with the separator interposed therebetween. As illustrated in FIG. 3, the electrode body 3 includes the exposed positive-electrode core portion 4 that is wound along one of the end portions in the direction of a winding axis and the exposed negative-electrode core portion 5 that is wound along the other end portion. The outermost circumference of the electrode body 3 is preferably covered by the separator.

Figure 4:
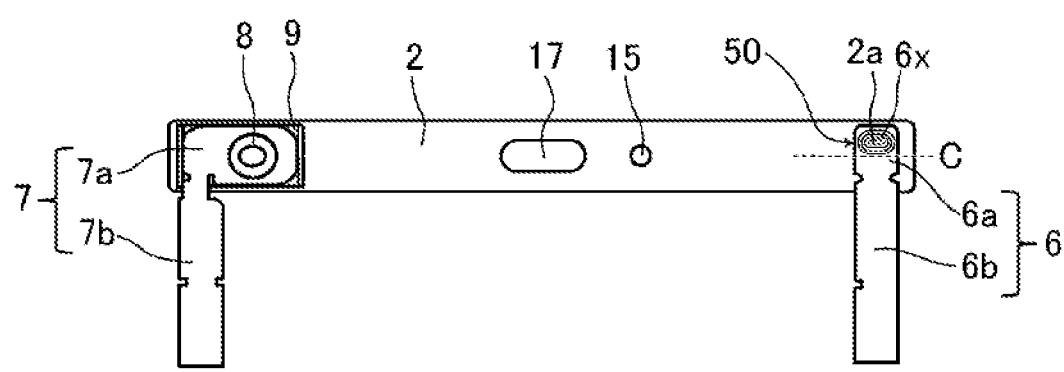
FIG. 4 illustrates a surface of a sealing plate on the inner side of the battery after components are installed.

Securing Negative-Electrode Current Collector and Negative-Electrode External Terminal to Sealing Plate The inner insulating member 9 is disposed on the sealing plate 2 on the inner surface side of the battery around a negative-terminal insertion hole 2d that is formed in the sealing plate 2, and a base 7a of the negative-electrode current collector 7 is disposed thereon. The outer insulating member 10 is disposed on the sealing plate 2 on the outer surface side of the battery around the negative-terminal insertion hole 2d. Subsequently, the negative-electrode external terminal 8 is inserted into a through-hole of the outer insulating member 10, the negative-terminal insertion hole 2d of the sealing plate 2, a through-hole of the inner insulating member 9, and a through-hole of the base 7a of the negative-electrode current collector 7. An end portion of the negative-electrode external terminal 8 is crimped on the base 7a of the negative-electrode current collector 7. Thus, as illustrated in FIG. 2 and FIG. 4, the negative-electrode external terminal 8, the outer insulating member 10, the inner insulating member 9, and the negative-electrode current collector 7 are secured to the sealing plate 2. A crimped portion of the negative-electrode external terminal 8 and the base 7a of the negative-electrode current collector 7 are preferably welded to each other by, for example, laser welding to form a welded joint (not illustrated).

Securing Positive-Electrode Current Collector to Sealing Plate

Figure 5:
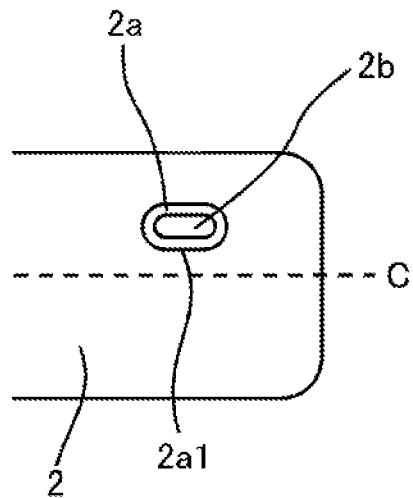
FIG. 5 is an enlarged view of the surface of the sealing plate on the inner side of the battery near a projection.

As illustrated in FIG. 5, a projection 2a is formed on the surface of the sealing plate 2 on the inner side of the battery. The projection 2a is located away from the center line C of the sealing plate 2 to one side (upward in FIG. 5) in the transverse direction of the sealing plate 2. The center line C passes through the center of the sealing plate 2 in the transverse direction of the sealing plate 2 and extends in the longitudinal direction of the sealing plate 2. A recessed end portion 2b is formed at an end of the projection 2a. The projection 2a is oval in a plan view. The projection 2a includes a projection linear portion 2a1 that extends linearly. The projection 2a may be disposed on the center line C.

Figure 6:
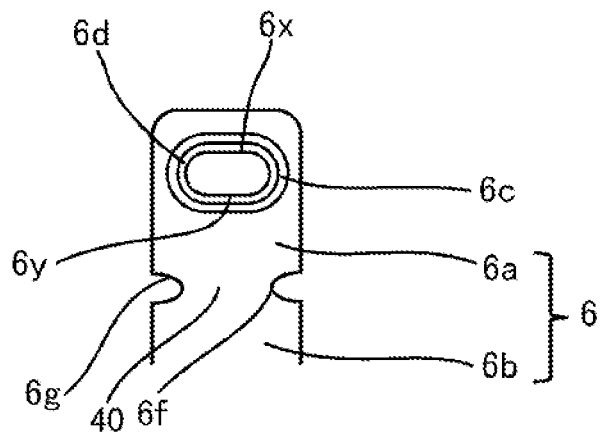
FIG. 6 is an enlarged plan view of a positive-electrode current collector near a base.

As illustrated in FIG. 6, a connection opening 6x is formed in a base 6a of the positive-electrode current collector 6. The connection opening 6x is oval in a plan view. An annular thin portion 6c is formed around the connection opening 6x. An annular projection 6d is formed along the edge of the connection opening 6x. A first boundary portion 40 between the base 6a and a lead 6b has a notch 6f and a notch 6g at ends thereof. There is a linear portion 6y along the connection opening 6x.

Figure 7:
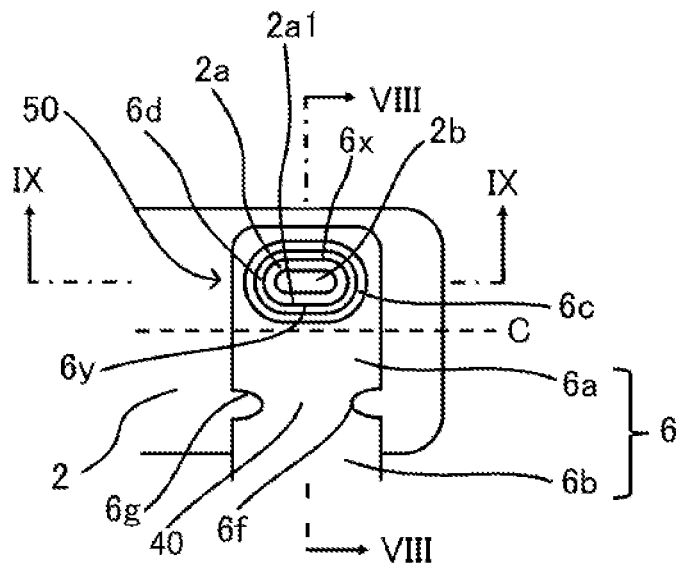
FIG. 7 is an enlarged plan view of the positive-electrode current collector that is disposed on the sealing plate near a contact between the sealing plate and the positive-electrode current collector.
Figure 8A:
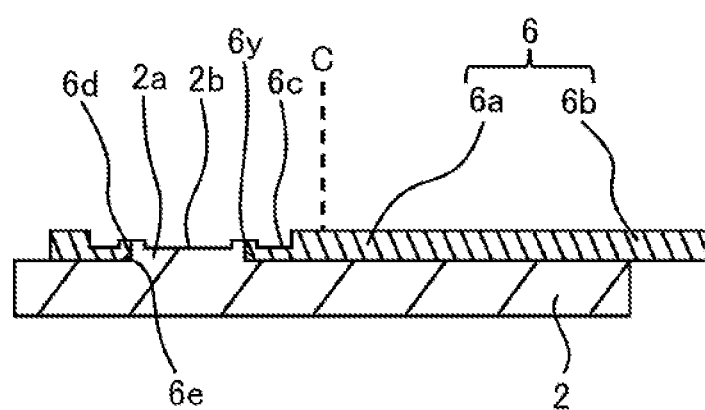
FIG. 8A is a sectional view of the positive-electrode current collector taken along line VIII-VIII in FIG. 7 before the sealing plate and the positive-electrode current collector are welded to each other.

FIG. 7 illustrates the positive-electrode current collector 6 that is disposed on the sealing plate 2. In FIG. 7, the lead 6b is not folded with respect to the base 6a. The projection 2a that is formed on the sealing plate 2 is fitted in the connection opening 6x of the base 6a of the positive-electrode current collector 6. The connection opening 6x is located away from the center line C of the sealing plate 2 to one side (upward in FIG. 7) in the transverse direction of the sealing plate 2. As illustrated in FIG. 7 and FIG. 8A, the positive-electrode current collector 6 is preferably disposed on the sealing plate 2 before the first boundary portion 40 between the base 6a and the lead 6b is folded. The positive-electrode current collector 6 may be disposed on the sealing plate 2 after the first boundary portion 40 is folded.

Figure 8B:
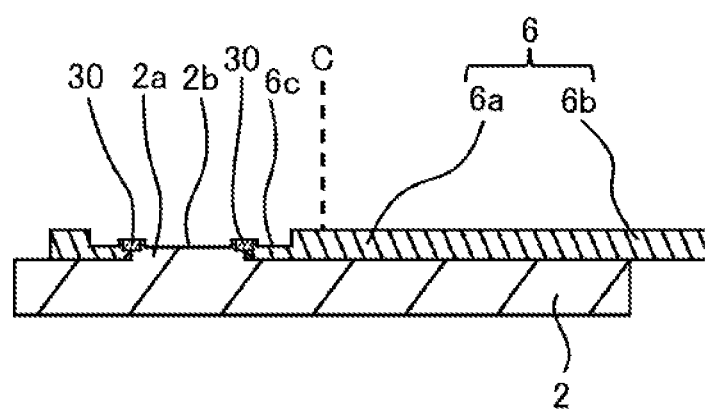
FIG. 8B is a sectional view of the positive-electrode current collector taken along line VIII-VIII in FIG. 7 after the sealing plate and the positive-electrode current collector are welded to each other.
Figure 9A:
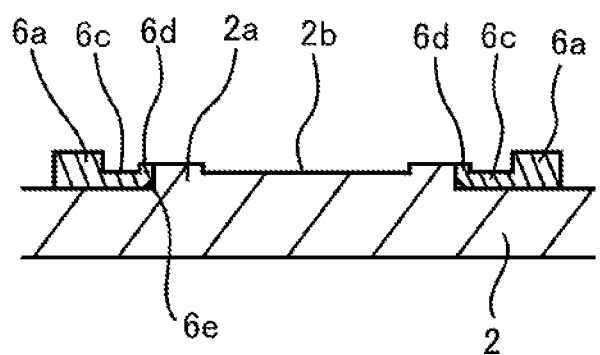
FIG. 9A is a sectional view of the positive-electrode current collector taken along line IX-IX in FIG. 7 before the sealing plate and the positive-electrode current collector are welded to each other.
Figure 9B:
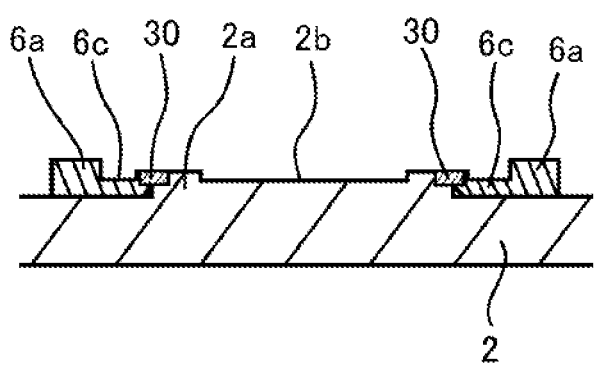
FIG. 9B is a sectional view of the positive-electrode current collector taken along line IX-IX in FIG. 7 after the sealing plate and the positive-electrode current collector are welded to each other.

In FIG. 8A and FIG. 9A, the projection 2a of the sealing plate 2 and the base 6a at the edge of the connection opening 6x are irradiated with energy rays such as laser rays. Consequently, as illustrated in FIG. 8B and FIG. 9B, weld nuggets 30 are formed, and the projection 2a of the sealing plate 2 and the base 6a are welded to each other. The weld nuggets 30 are preferably formed on the annular projection 6d that the base 6a includes and the projection 2a of the sealing plate 2.

The recessed end portion 2b is preferably formed at the end of the projection 2a that is formed on the sealing plate 2. This structure increases the size of the weld nuggets 30 that are formed when the projection 2a of the sealing plate 2 and the base 6a of the positive-electrode current collector 6 at the edge of the connection opening 6x are welded to each other, for example, by being irradiated with the energy rays. Accordingly, the sealing plate 2 and the positive-electrode current collector 6 are more firmly connected to each other. Consequently, the reliability of the prismatic secondary battery increases. The recessed end portion 2b is not an essential component.

The annular thin portion 6c is formed around the connection opening 6x that is formed in the base 6a of the positive-electrode current collector 6. The annular projection 6d is formed along the edge of the connection opening 6x. This structure increases the size of welded joints that are formed when the projection 2a of the sealing plate 2 and the base 6a of the positive-electrode current collector 6 at the edge of the connection opening 6x are welded to each other, for example, by being irradiated with the energy rays. Accordingly, the sealing plate 2 and the positive-electrode current collector 6 are more firmly connected to each other. It is preferable that an end (upper end in FIG. 8A) of the annular projection 6d does not project beyond the surface (upper surface in FIG. 8A) of the base 6a of the positive-electrode current collector 6 facing the electrode body 3. The annular thin portion 6c and the annular projection 6d are not essential components.

As illustrated in FIG. 8A and FIG. 9A, a tapered portion 6e is preferably formed on an end portion (lower end portion in FIG. 8A) facing the sealing plate 2 along the connection opening 6x that is formed in the base 6a of the positive-electrode current collector 6. This prevents the projection 2a from damaging when the projection 2a is inserted into the connection opening 6x.

As illustrated in FIG. 1 and FIG. 2, a recessed portion 2c is preferably formed on the surface of the sealing plate 2 on the outer side of the battery so as to face the projection 2a. A pair of first grooves 2e that extend in the longitudinal direction of the sealing plate 2 are preferably formed on the surface of the sealing plate 2 on the outer side of the battery. A pair of second grooves 2f that extend in the transverse direction of the sealing plate 2 are preferably formed on the surface of the sealing plate 2 on the outer side of the battery.

Folding Positive-Electrode Current Collector and Negative-Electrode Current Collector The positive-electrode current collector 6 that is connected to the sealing plate 2 is folded along the first boundary portion 40 between the base 6a and the lead 6b. At this time, the lead 6b is preferably folded with respect to the base 6a while the base 6a is pressed against the sealing plate 2.

The first boundary portion 40 (folded portion) between the lead 6b and the base 6a is located away from the center line C of the sealing plate 2 to one side in the transverse direction of the sealing plate 2. A contact 50 between the sealing plate 2 and the positive-electrode current collector 6 is located away from the center line C of the sealing plate 2 to the other side. Accordingly, the contact 50 between the sealing plate 2 and the positive-electrode current collector 6 is located farther away from the first boundary portion 40 (folded portion) between the base 6a and the lead 6b. Accordingly, a load is effectively inhibited from being applied to the contact 50 between the sealing plate 2 and the positive-electrode current collector 6 when the lead 6b is folded with respect to the base 6a. Consequently, the contact 50 between the sealing plate 2 and the positive-electrode current collector 6 can be effectively prevented from damaging and breaking.

As illustrated in FIG. 7, the first boundary portion 40 between the base 6a and the lead 6b preferably has the notch 6g and the notch 6f at the ends thereof in the width direction. This inhibits a load from being applied to the contact 50 between the sealing plate 2 and the positive-electrode current collector 6 when the positive-electrode current collector 6 is folded.

The negative-electrode current collector 7 is also folded along a boundary portion between the base 7a and the lead 7b.

The positive-electrode current collector 6 and the negative-electrode current collector 7 preferably have a flat plate shape when being mounted on the sealing plate 2.

Connection Between Positive-Electrode Current Collector and Electrode Body and Between Negative-Electrode Current Collector and Electrode Body The lead 6b of the positive-electrode current collector 6 is welded to the outermost surface of the exposed positive-electrode core portion 4 of the electrode body 3 that is wound. The lead 7b of the negative-electrode current collector 7 is welded to the outermost surface of the exposed negative-electrode core portion 5 of the electrode body 3 that is wound. Examples of a connecting method can include resistance welding, ultrasonic welding, and laser welding.

Assembly of Prismatic Secondary Battery

The electrode body 3, which is connected to the sealing plate 2 with the positive-electrode current collector 6 and the negative-electrode current collector 7 interposed therebetween, is covered by the insulation sheet 14. Subsequently, the electrode body 3 that is covered by the insulation sheet 14 is inserted into the prismatic exterior body 1. The prismatic exterior body 1 and the sealing plate 2 are welded to each other by laser welding, and the opening of the prismatic exterior body 1 is sealed by the sealing plate 2. Subsequently, a non-aqueous electrolytic solution containing a non-aqueous solvent and an electrolyte salt is injected into the prismatic exterior body 1 from the electrolytic solution injection hole 15 that is formed in the sealing plate 2. The electrolytic solution injection hole 15 is sealed by the sealing plug 16. A blind rivet is preferably used as the sealing plug 16. The sealing plug 16 that is composed of a metal can be welded to the sealing plate 2.

Prismatic Secondary Battery 20

As illustrated in FIG. 7, the projection 2a that is formed on the sealing plate 2 is fitted in the connection opening 6x that is formed in the base 6a of the positive-electrode current collector 6. Accordingly, the sealing plate 2 and the positive-electrode current collector 6 are firmly connected to each other. The linear portion 6y extends in the longitudinal direction of the sealing plate 2 near the lead 6b along the edge of the connection opening 6x that is formed in the base 6a of the positive-electrode current collector 6. Accordingly, a load is inhibited from concentrating on a point of the contact 50 between the sealing plate 2 and the positive-electrode current collector 6 when the positive-electrode current collector 6 is pulled by the electrode body 3 in the direction toward the bottom of the prismatic exterior body 1. Consequently, the contact 50 between the sealing plate 2 and the positive-electrode current collector 6 can be more effectively inhibited from damaging and breaking.

Two linear portions preferably extend in the longitudinal direction of the sealing plate 2 along the edge of the connection opening 6x that is formed in the base 6a of the positive-electrode current collector 6. The projection 2a of the sealing plate 2 preferably includes two linear portions that extend along the outer circumference thereof in the longitudinal direction of the sealing plate 2 in a plan view. The two linear portions along the edge of the connection opening 6x preferably face the two linear portions of the projection 2a. With this structure, the contact 50 between the sealing plate 2 and the positive-electrode current collector 6 is more unlikely to damage and break.

Figure 10:
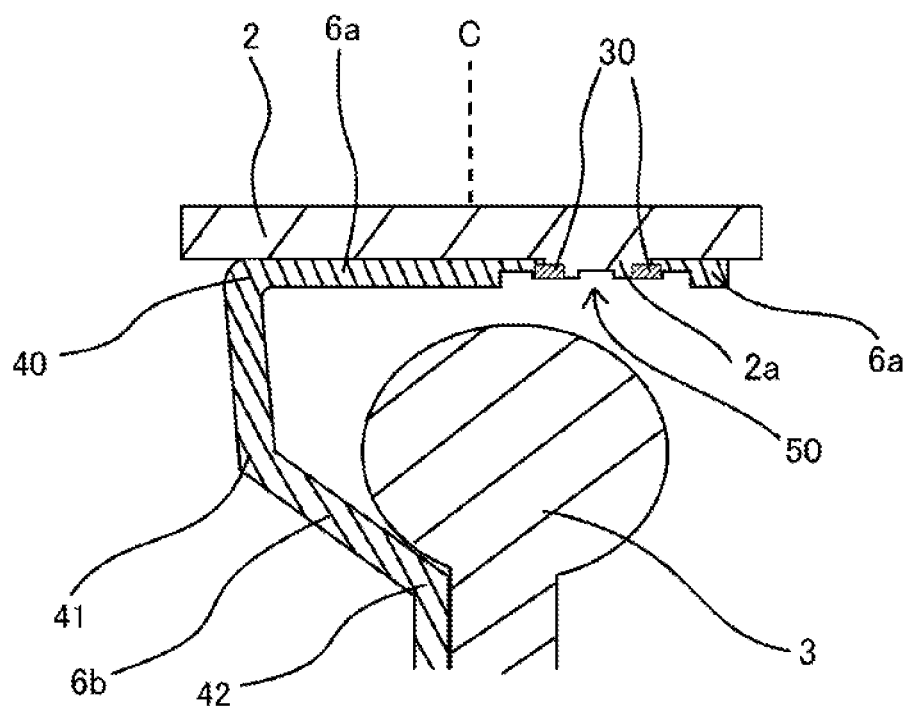
FIG. 10 is a sectional view of the vicinity of the contact between the sealing plate and the positive-electrode current collector taken along the transverse direction of the sealing plate after the electrode body is connected to the positive-electrode current collector.

As illustrated in FIG. 10, the first boundary portion 40 between the lead 6b and the base 6a of the prismatic secondary battery 20 is located away from the center line C of the sealing plate 2 to one side (left-hand side in FIG. 10). The contact 50 between the sealing plate 2 and the positive-electrode current collector 6 is located away from the center line C of the sealing plate 2 to the other side (right-hand side in FIG. 10). Accordingly, the contact 50 between the sealing plate 2 and the positive-electrode current collector 6 is located farther away from the first boundary portion 40 between the base 6a and the lead 6b. Accordingly, a load is unlikely to be applied to the contact 50 between the sealing plate 2 and the positive-electrode current collector 6 even when the prismatic secondary battery 20 is strongly impacted or vibrated, the electrode body 3 is subjected to a force and moved in the prismatic exterior body 1, and the positive-electrode current collector 6 that is connected to the electrode body 3 is pulled. Consequently, the reliability of the prismatic secondary battery increases. The contact 50 between the sealing plate 2 and the positive-electrode current collector 6 may be located on the center line C.

The lead 6b of the positive-electrode current collector 6 includes a first folded portion 41 and a second folded portion 42. When the positive-electrode current collector 6 is pulled by the electrode body 3, a load is more effectively inhibited from being applied to the contact 50 between the sealing plate 2 and the positive-electrode current collector 6 because the first folded portion 41 and the second folded portion 42 absorb the load. The first folded portion 41 and the second folded portion 42 linearly extend in the longitudinal direction of the sealing plate 2 (from the front side to the rear side in FIG. 10). The first folded portion 41 is nearer than the second folded portion 42 to the sealing plate 2 in a direction perpendicular to the sealing plate 2. The first folded portion 41 is nearer than the second folded portion 42 to the outside in the transverse direction of the sealing plate 2, that is, to a side wall of the prismatic exterior body 1. The first folded portion 41 and the second folded portion 42 may be formed before the positive-electrode current collector 6 is connected to the sealing plate 2 or may be formed after the positive-electrode current collector 6 is connected to the sealing plate 2. The first folded portion 41 and the second folded portion 42 are not necessarily formed.

Contact Between Sealing Plate and Positive-Electrode Current Collector

Figure 11:
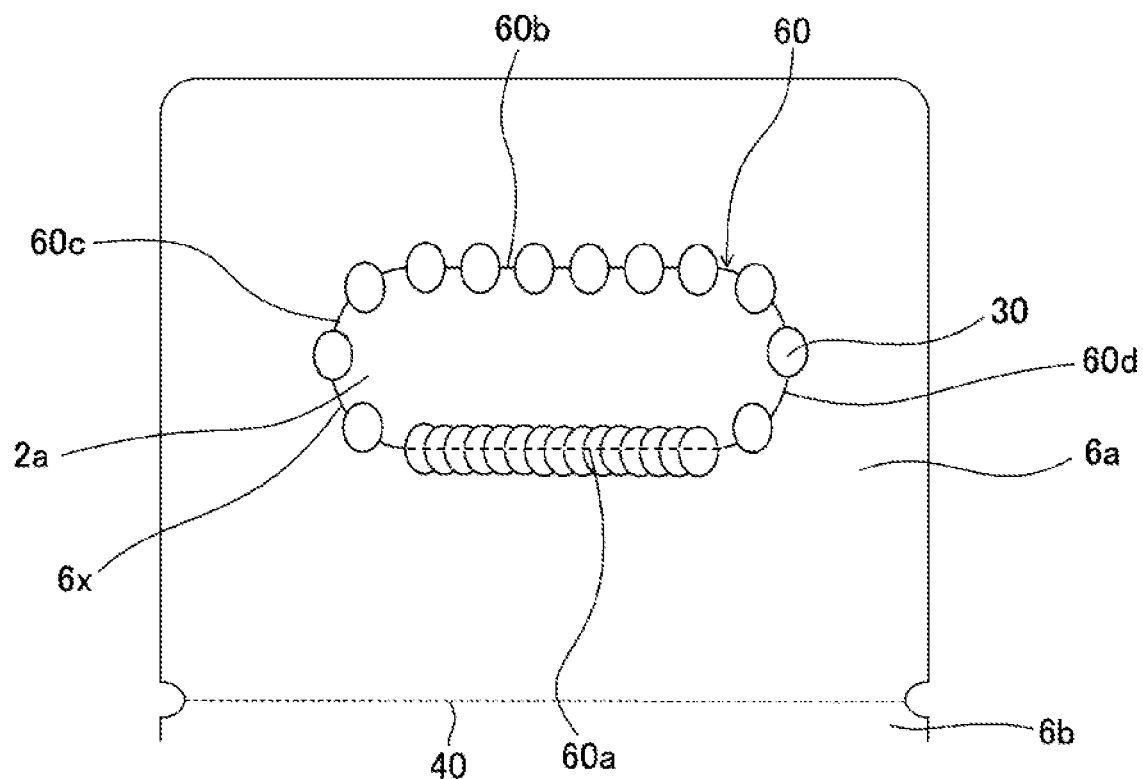
FIG. 11 is an enlarged view of the vicinity of the contact between the sealing plate and the base of the positive-electrode current collector of the prismatic secondary battery according to the first embodiment.

FIG. 11 is an enlarged view of the vicinity of the contact between the sealing plate 2 and the base 6a of the positive-electrode current collector 6 of the prismatic secondary battery 20 according to the first embodiment. FIG. 11 illustrates the vicinity of the contact between the sealing plate 2 and the base 6a of the positive-electrode current collector 6 from a direction perpendicular to the sealing plate 2. In FIG. 11, the recessed end portion 2b of the sealing plate 2, the annular thin portion 6c and annular projection 6d of the positive-electrode current collector 6 are omitted.

As illustrated in FIG. 11, a second boundary portion 60, which is a boundary portion between the projection 2a of the sealing plate 2 and the base 6a of the positive-electrode current collector 6, is oval. The second boundary portion 60 also corresponds to the boundary between the projection 2a and the edge of the connection opening 6x that is formed in the base 6a.

The second boundary portion 60 between the projection 2a of the sealing plate 2 and the base 6a of the positive-electrode current collector 6 includes a first linear portion 60a, a second linear portion 60b, a first curved portion 60c, and a second curved portion 60d. The first linear portion 60a of the second boundary portion 60 corresponds to the boundary between the linear portion 6y along the connection opening 6x in the base 6a and the projection linear portion 2a1 of the projection 2a of the sealing plate 2.

At the first linear portion 60a of the second boundary portion 60 that is located near the first boundary portion 40 between the base 6a and the lead 6b, the density of the weld nuggets 30 is higher than that in the other region of the second boundary portion 60. In the prismatic secondary battery 20, the distance between the weld nuggets 30 at the first linear portion 60a is shorter than the distance between the weld nuggets 30 in the other region, and consequently, the density of the weld nuggets 30 at the first linear portion 60a is higher than that in the other region.

Figure 12A:
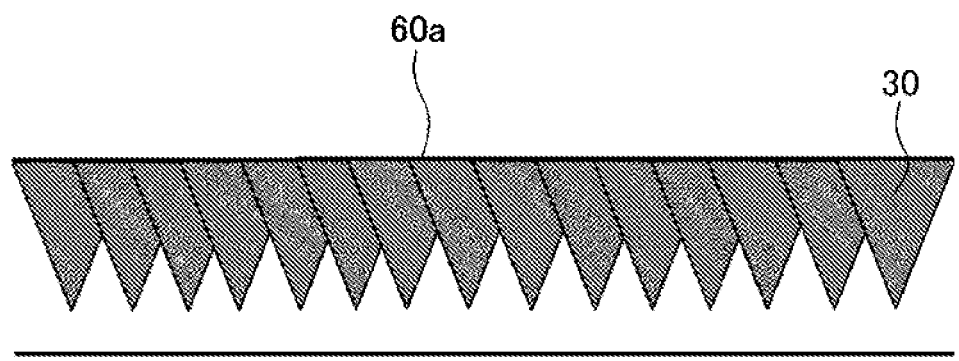
FIG. 12A illustrates an interface between the projection of the sealing plate and a first linear portion of a second boundary portion of the base in the thickness direction of the sealing plate in the prismatic secondary battery according to the first embodiment.
Figure 12B:
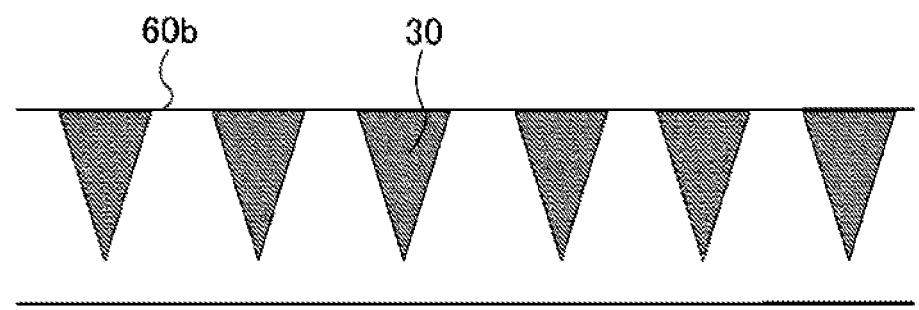
FIG. 12B illustrates an interface between the projection of the sealing plate and a second linear portion of the second boundary portion of the base in the thickness direction of the sealing plate in the prismatic secondary battery according to the first embodiment.

FIG. 12A illustrates an interface between the projection 2a of the sealing plate 2 and the first linear portion 60a of the second boundary portion 60 of the base 6a in the thickness direction of the sealing plate 2. FIG. 12B illustrates an interface between the projection 2a of the sealing plate 2 and the second linear portion 60b of the second boundary portion 60 of the base 6a in the thickness direction of the sealing plate 2. Each weld nugget 30 at the first linear portion 60a and the second linear portion 60b has the same size. However, the distance between the weld nuggets 30 differs between the first linear portion 60a and the second linear portion 60b. At the first linear portion 60a, the weld nuggets 30 overlap each other, and the density of the weld nuggets 30 is higher than that at the second linear portion 60b.

The reliability of the contact between the sealing plate 2 and the positive-electrode current collector 6 depends on how the weld nuggets 30 are formed in the region of the second boundary portion 60 near the first boundary portion 40 between the base 6a and the lead 6b.

When the prismatic secondary battery 20 is impacted or vibrated, the electrode body 3 produces a force to pull the positive-electrode current collector 6. The maximum load is applied to the contact between the projection 2a that is formed on the sealing plate 2 and the base 6a of the positive-electrode current collector 6 at a position nearest to the lead 6b. For this reason, in the prismatic secondary battery 20, the weld nuggets 30 are densely formed near the first boundary portion 40 between the base 6a and the lead 6b in the second boundary portion 60. This increases the reliability of the contact between the sealing plate 2 and the positive-electrode current collector 6.

In the case where the weld nuggets 30 are formed in the same state over the entire second boundary portion 60, energy required for welding increases, and there is a high possibility that metal spatters, for example, are produced during welding. In the prismatic secondary battery 20 according to the first embodiment, the density of the weld nuggets 30 at the first linear portion 60a of the second boundary portion 60 that is located near the first boundary portion 40 between the base 6a and the lead 6b is higher than that in the other region of the second boundary portion 60. This increases the reliability of the contact between the sealing plate 2 and the positive-electrode current collector 6, decreases the energy require for welding, inhibits, for example, the spatters from being produced, and effectively inhibits, for example, an internal short circuit from occurring.

Second Embodiment

Figure 13:
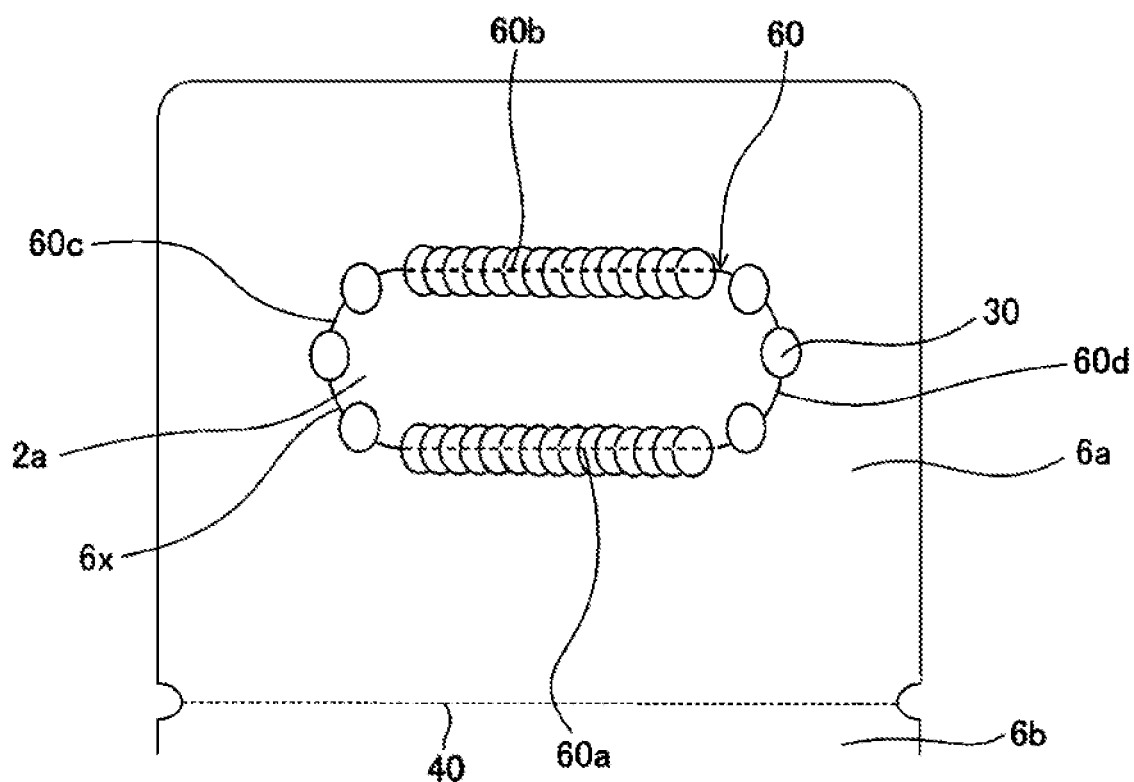
FIG. 13 is an enlarged view of the vicinity of the contact between the sealing plate and the base of the positive-electrode current collector of a prismatic secondary battery according to a second embodiment.

FIG. 13 illustrates a prismatic secondary battery according to a second embodiment and corresponds to FIG. 11. The prismatic secondary battery according to the second embodiment has the same structure as the prismatic secondary battery 20 according to the first embodiment except that the state of the weld nuggets 30 that are formed differs.

As illustrated in FIG. 13, in the prismatic secondary battery according to the second embodiment, the density of the weld nuggets 30 at the first linear portion 60a and the second linear portion 60b is higher than that at the first curved portion 60c and the second curved portion 60d.

Third Embodiment

Figure 14:
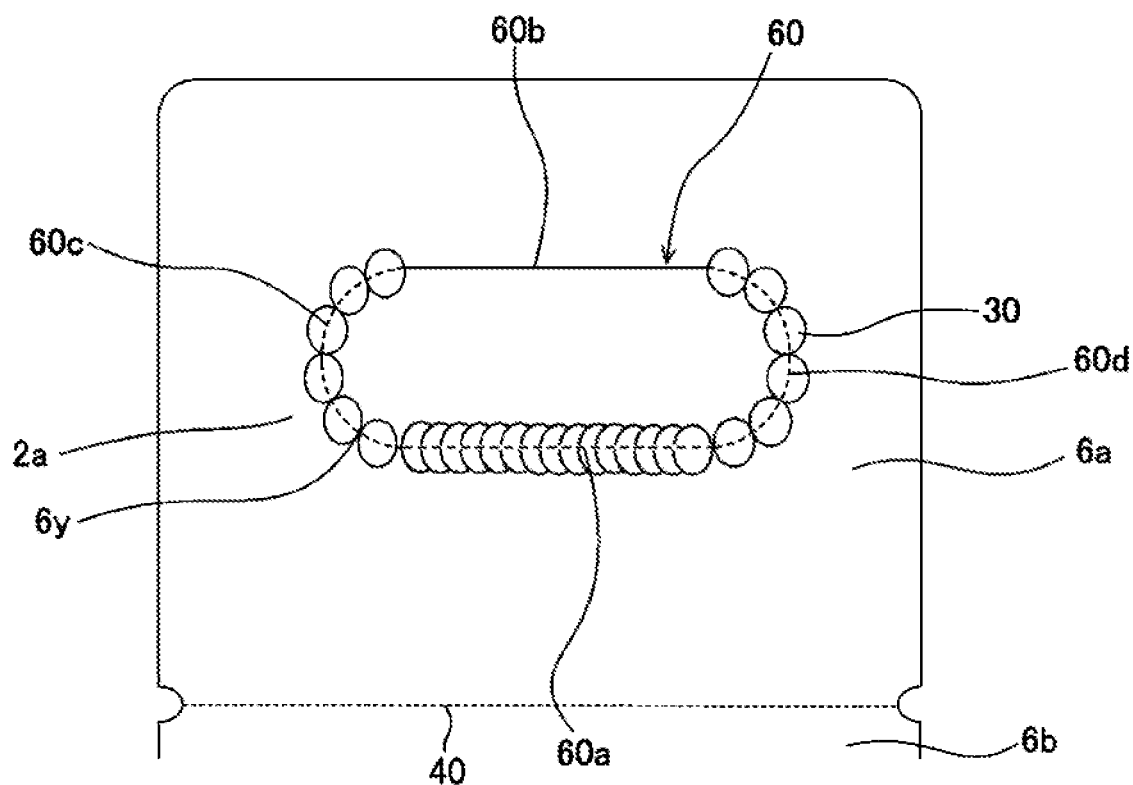
FIG. 14 is an enlarged view of the vicinity of the contact between the sealing plate and the base of the positive-electrode current collector of a prismatic secondary battery according to a third embodiment.

FIG. 14 illustrates a prismatic secondary battery according to a third embodiment and corresponds to FIG. 11. The prismatic secondary battery according to the third embodiment has the same structure as the prismatic secondary battery 20 according to the first embodiment except that the state of the weld nuggets 30 that are formed differs.

As illustrated in FIG. 14, in the prismatic secondary battery according to the third embodiment, the weld nuggets 30 are not formed at the second linear portion 60b. The density of the weld nuggets 30 at the first linear portion 60a is higher than that at the first curved portion 60c and the second curved portion 60d.

Figure 15A:
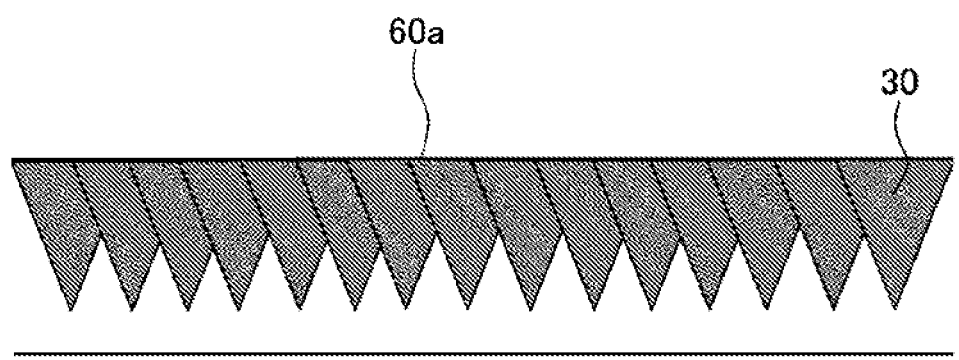
FIG. 15A illustrates the interface between the projection of the sealing plate and the first linear portion of the second boundary portion of the base in the thickness direction of the sealing plate in the prismatic secondary battery according to the third embodiment.
Figure 15B:
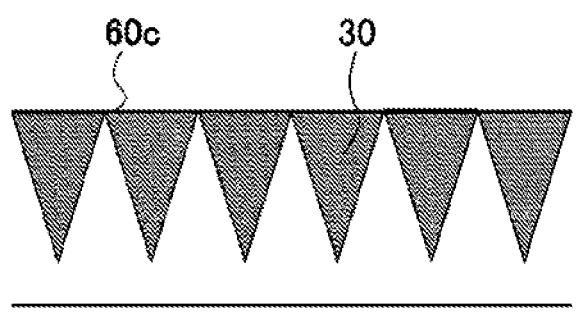
FIG. 15B illustrates the interface between the projection of the sealing plate and a first curved portion of the second boundary portion of the base in the thickness direction of the sealing plate in the prismatic secondary battery according to the third embodiment.

FIG. 15A illustrates the interface between the projection 2a of the sealing plate 2 and the first linear portion 60a of the second boundary portion 60 of the base 6a in the thickness direction of the sealing plate 2. FIG. 15B illustrates the interface between the projection 2a of the sealing plate 2 and the first curved portion 60c of the second boundary portion 60 of the base 6a in the thickness direction of the sealing plate 2. Each weld nugget 30 at the first linear portion 60a and the first curved portion 60c has the same size. However, the distance between the weld nuggets 30 differs between the first linear portion 60a and the first curved portion 60c. At the first linear portion 60a, the weld nuggets 30 overlap each other, and the density of the weld nuggets 30 is higher than that at the first curved portion 60c.

Fourth Embodiment

Figure 16:
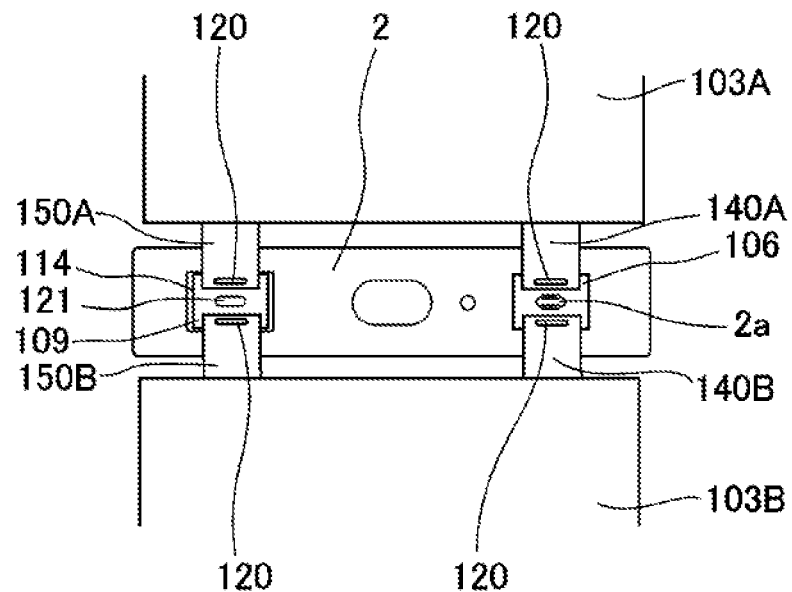
FIG. 16 illustrates the sealing plate on the inner side of the battery after tab portions are mounted on the current collector of a prismatic secondary battery according to a fourth embodiment.

FIG. 16 illustrates the sealing plate on the inner side of the battery during assembly of a prismatic secondary battery according to a fourth embodiment.

The electrode body of the prismatic secondary battery according to the fourth embodiment includes a first electrode body element 103A and a second electrode body element 103B. The first electrode body element 103A and the second electrode body element 103B each include the positive-electrode sheet and the negative-electrode sheet. The positive-electrode sheet includes positive-electrode tabs, and the negative-electrode sheet includes negative-electrode tabs. The positive-electrode tabs can be a part of the positive-electrode core. The negative-electrode tabs can be a part of the negative-electrode core.

The first electrode body element 103A and the second electrode body element 103B may be stacked electrode body elements each of which includes the positive-electrode sheets and the negative-electrode sheets. In this case, one of the positive-electrode sheets includes at least one positive-electrode tab portion, and one of the negative-electrode sheets includes at least one negative-electrode tab portion. The first electrode body element 103A and the second electrode body element 103B may be electrode body elements that are wound, each of which is obtained by winding a belt-like positive-electrode sheet and a belt-like negative-electrode sheet with the separator interposed therebetween. In this case, the positive-electrode sheet can include positive-electrode tab portions that are spaced apart from each other, and the negative-electrode sheet can include negative-electrode tab portions that are spaced apart from each other.

The positive-electrode tabs of the positive-electrode sheet that is included in the first electrode body element 103A are stacked and form a first positive-electrode tab group 140A. The negative-electrode tabs of the negative-electrode sheet that is included in the first electrode body element 103A are stacked and form a first negative-electrode tab group 150A. The positive-electrode tabs of the positive-electrode sheet that is included in the second electrode body element 103B are stacked and form a second positive-electrode tab group 140B. The negative-electrode tabs of the negative-electrode sheet that is included in the second electrode body element 103B are stacked and form a second negative-electrode tab group 150B.

The first positive-electrode tab group 140A and the second positive-electrode tab group 140B are welded to a positive-electrode current collector 106. The first negative-electrode tab group 150A and the second negative-electrode tab group 150B are welded to a negative-electrode current collector 109. Consequently, welds 120 are formed.

The negative-electrode external terminal (not illustrated) is secured to the sealing plate 2 with an outer insulating member (not illustrated) and an inner insulating member 114 interposed therebetween. The projection 2a is formed on the sealing plate 2.

The positive-electrode current collector 106 to which the first positive-electrode tab group 140A and the second positive-electrode tab group 140B are connected is connected to the projection 2a that is formed on the sealing plate 2. The negative-electrode current collector 109 to which the first negative-electrode tab group 150A and the second negative-electrode tab group 150B are connected is connected to the negative-electrode external terminal that is secured to the sealing plate 2, and a weld 121 is formed. This state is illustrated in FIG. 16.

Figure 17:
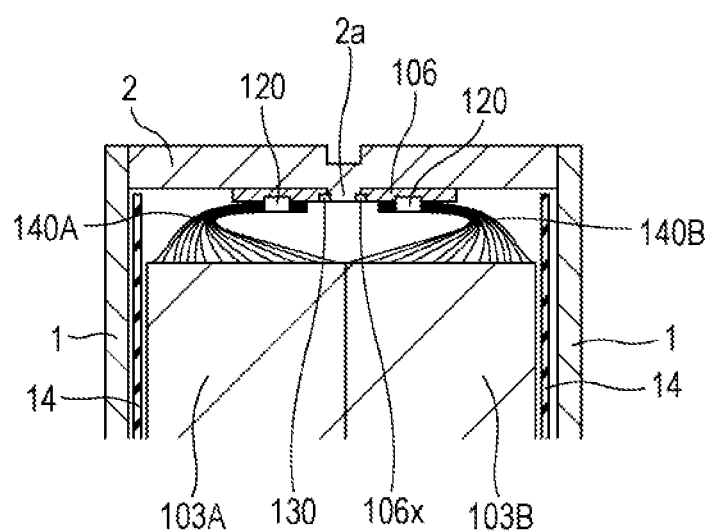
FIG. 17 is a sectional view of the vicinity of the contact between the projection of the sealing plate and the positive-electrode current collector taken along the transverse direction of the sealing plate according to the fourth embodiment of the prismatic secondary battery.

Subsequently, the first electrode body element 103A and the second electrode body element 103B are integrated. Consequently, the first positive-electrode tab group 140A and the second positive-electrode tab group 140B curve in different directions, and the first negative-electrode tab group 150A and the second negative-electrode tab group 150B curve in different directions. When the prismatic secondary battery is manufactured in this way, as illustrated in FIG. 17, a space between the sealing plate 2 and the electrode body that is formed of the first electrode body element 103A and the second electrode body element 103B can be decreased. This enables the prismatic secondary battery to have an increased volume energy density. Since the first positive-electrode tab group 140A and the second positive-electrode tab group 140B curve, a load is unlikely to be applied to the contact between the projection 2a of the sealing plate 2 and the positive-electrode current collector 106.

The components of the prismatic secondary battery according to the fourth embodiment that are not specifically described can be the same components as in the prismatic secondary battery 20 according to the first embodiment.

Figure 18:
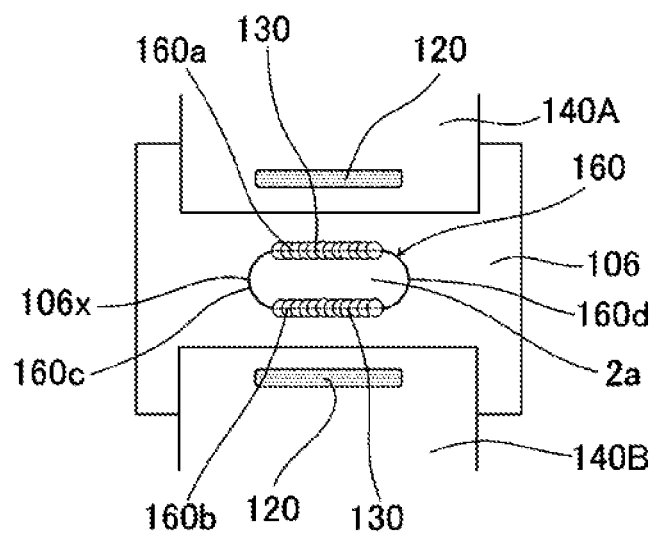
FIG. 18 is an enlarged view of the vicinity of the contact between the projection of the sealing plate and the positive-electrode current collector in FIG. 16.

As illustrated in FIG. 17 and FIG. 18, the projection 2a of the sealing plate 2 is fitted in a connection opening 106x of the positive-electrode current collector 106. The projection 2a and the positive-electrode current collector 106 are welded to each other, and weld nuggets 130 are formed. With this structure, the secondary battery has high reliability of the contact between the sealing plate 2 and the positive-electrode current collector 106.

As illustrated in FIG. 18, a third boundary portion 160 between the projection 2a and the positive-electrode current collector 106 preferably includes a first linear portion 160a that extends along the weld 120 between the first positive-electrode tab group 140A and the positive-electrode current collector 106 and a second linear portion 160b that extends along the weld 120 between the second positive-electrode tab group 140B and the positive-electrode current collector 106. With this structure, when the prismatic secondary battery is strongly impacted or vibrated, a load is effectively inhibited from concentrating on a point of the contact between the sealing plate 2 and the positive-electrode current collector 106. Consequently, the reliability of the prismatic secondary battery increases.

As illustrated in FIG. 18, the density of the weld nuggets 130 at two regions is higher than that at the other region, and the two regions include a region of the third boundary portion 160 between the projection 2a and the positive-electrode current collector 106 that is nearest to the weld 120 between the positive-electrode current collector 106 and the first positive-electrode tab group 140A, and a region of the third boundary portion 160 between the projection 2a and the positive-electrode current collector 106 that is nearest to the weld 120 between the positive-electrode current collector 106 and the second positive-electrode tab group 140B. Consequently, the reliability of the prismatic secondary battery increases. The weld nuggets can be formed at a first curved portion 160c and a second curved portion 160d of the third boundary portion 160 between the projection 2a and the positive-electrode current collector 106.

It can be thought that the weld nuggets 130 are formed in substantially the same state at the entire boundary portion between the projection 2a and the positive-electrode current collector 106 of the prismatic secondary battery according to the fourth embodiment. In this case, there is a high possibility that metal spatters are produced. However, the reliability of the contact between the sealing plate 2 and the positive-electrode current collector 106 increases.

In the prismatic secondary battery according to the fourth embodiment, the entire the positive-electrode current collector 106, which has a flat plate shape, faces the sealing plate 2. Accordingly, the entire positive-electrode current collector 106 corresponds to the base.

According to the fourth embodiment, the structure of the projection 2a of the sealing plate 2 can be the same as in the prismatic secondary battery 20 according to the first embodiment. According to the fourth embodiment, the structure of the positive-electrode current collector 106 can be the same as the base 6a of the positive-electrode current collector 6 of the prismatic secondary battery 20 according to the first embodiment.

Others

For example, the diameter of each weld nugget is preferably 0.3 mm to 1.2 mm, more preferably 0.5 mm to 1.2 mm, further preferably 0.5 mm to 1.0 mm. For example, the depth of each weld nugget is preferably 0.1 mm to 1.5 mm, more preferably 0.2 mm to 1.0 mm, further preferably 0.3 mm to 0.7 mm. A linear weld nugget is preferably formed, or spot-like weld nuggets preferably overlap each other at a part of the boundary portion between the projection and the base that is nearest to the boundary between the base and the lead or at a part of the boundary portion between the projection and the base that is nearest to the contact between the base and the tab portions.

A connection notch can be formed near the outer circumference of the base of the current collector instead of forming the connection opening in the base of the current collector. The projection that is formed on the sealing plate can be fitted in the connection opening or the connection notch that is formed in the base of the negative-electrode current collector for welding.

Whether the weld nuggets are formed densely or sparsely can be determined, for example, by comparing a ratio between the area of the weld nuggets on the interface that passes through the boundary between the projection and the base and that extends in the thickness direction of the sealing plate, and the area of the interface.

For example, a continuous wave laser can be used to continuously form the weld nuggets.

In a plan view, the shape of the boundary portion between the projection of the sealing plate and the base of the current collector can be a quadrangular shape (including a quadrangular shape whose corners are rounded), an elliptic shape or another shape.

In the case where, in a plan view, the shape of the boundary portion between the projection of the sealing plate and the base of the current collector is a substantially quadrangular shape, the linear portions of the substantially quadrangular shape preferably extend along the boundary portion between the base and the lead. At the linear portions that extend along the boundary portion between the base and the lead, the density of the weld nuggets is preferably higher than that in the other region.

In the case where, in a plan view, the shape of the boundary portion between the projection of the sealing plate and the base of the current collector is an elliptic shape, a small-curvature region of the boundary portion having the elliptic shape preferably extends along the boundary portion between the base and the lead. At the small-curvature region that extends along the boundary portion between the base and the lead, the density of the weld nuggets is preferably higher than that in the other region.

The density of the weld nuggets can be controlled in a manner in which the diameter of each weld nugget is changed or the depth of each weld nugget, for example, is changed.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
   an electrode body that includes a first electrode sheet and a second electrode sheet having a polarity different from a polarity of the first electrode sheet;
   an exterior body that has an opening and that accommodates the electrode body;
   a sealing plate that seals the opening; and
   a current collector that is electrically connected to the first electrode sheet,
   wherein the current collector includes a base that faces the sealing plate,
   wherein a projection is formed on a surface of the sealing plate on an electrode body side,
   wherein a connection opening or a connection notch is formed in the base,
   wherein the projection is fitted in the connection opening or the connection notch, and
   wherein the projection and the base are welded to each other, and a weld nugget is formed.

2. The secondary battery according to claim 1,
   wherein the current collector includes a lead that extends from an end portion of the base to the electrode body, and
   wherein a part of a boundary portion between the projection and the base that is nearest to a boundary between the base and the lead contains a region in which a density of the weld nugget is higher than that in another region of the boundary portion which is farther from the boundary between the base and the lead than the part of a boundary portion between the projection and the base.

3. The secondary battery according to claim 2,
   wherein the secondary battery is a prismatic secondary battery,
   wherein the lead is disposed on the end portion of the base in a transverse direction of the sealing plate, and the boundary portion contains a region that extends along the boundary between the base and the lead, and
   wherein the region that extends along the boundary between the base and the lead contains the region in which the density of the weld nugget is higher than that in another region of the boundary portion which extends toward or away from the boundary between the base and the lead.

4. The secondary battery according to claim 1 further comprising:
   tab portions that are disposed on the first electrode sheet,
   wherein the tab portions are stacked on and connected to the base, and
   wherein a part of the boundary portion between the projection and the base that is nearest to a contact between the base and the tab portions contains a linear portion that extends along the contact between the base and the tab portions.

5. The secondary battery according to claim 1 further comprising:
   tab portions that are disposed on the first electrode sheet,
   wherein the tab portions are stacked on and connected to the base, and
   wherein a part of the boundary portion between the projection and the base that is nearest to a contact between the base and the tab portions contains a region in which the density of the weld nugget is higher than that in another region of the boundary portion which is farther from the contact between the base and the tab portions than the part of a boundary portion between the projection and the base.

6. The secondary battery according to claim 5,
   wherein a region of the boundary portion that extends along the contact between the base and the tab portions contains the region in which the density of the weld nugget is higher than that in the another region of the boundary portion which is farther from the contact between the base and the tab portions than the part of a boundary portion between the projection and the base.

7. A method for manufacturing a secondary battery including an electrode body that includes a first electrode sheet and a second electrode sheet having a polarity different from a polarity of the first electrode sheet, an exterior body that has an opening and that accommodates the electrode body, a sealing plate that seals the opening, and a current collector that is electrically connected to the first electrode sheet, the current collector including a base that faces the sealing plate, the method comprising:
   a step of disposing a projection that is formed on the sealing plate in a connection opening or a connection notch that is formed in the base; and
   a step of welding the projection and the base to each other to form a weld nugget in a manner in which the projection and the base are irradiated with energy rays.

8. The method according to claim 7,
   wherein the current collector includes a lead that extends from an end portion of the base to the electrode body, and
   wherein, in the step of welding, the projection and an edge portion around the connection opening or the connection notch are welded to each other such that a part of a boundary portion between the projection and the base that is nearest to a boundary between the base and the lead contains a region in which a density of the weld nugget is higher than that in another region of the boundary portion which is farther from the boundary between the base and the lead than the part of a boundary portion between the projection and the base.

9. The method according to claim 8,
wherein the secondary battery is a prismatic secondary battery,
wherein the lead is disposed on the end portion of the base in a transverse direction of the sealing plate, and the boundary portion contains a region that extends along the boundary between the base and the lead, and
wherein the region that extends along the boundary between the base and the lead contains the region in which the density of the weld nugget is higher than that in the another region of the boundary portion which extends toward or away from the boundary between the base and the lead.

10. The method according to claim 8 further comprising:
a step of folding the lead with respect to the base after the step of welding.

11. The method according to claim 7,
wherein the secondary battery includes tab portions that are disposed on the first electrode sheet,
wherein the tab portions are stacked on and connected to the base,
wherein a first tab group in which the tab portions are stacked and a second tab group in which tab portions are stacked are connected to the base, and the first tab group and the second tab group are curved in different directions,
wherein the step of welding is performed after the first tab group and the second tab group are connected, and
wherein the first tab group and the second tab group are curved after the step of welding.

12. The method according to claim 7,
wherein the secondary battery includes tab portions that are disposed on the first electrode sheet,
wherein the tab portions are stacked on and connected to the base, and
wherein, in the step of welding, the projection and the base are welded to each other such that a part of the boundary portion between the projection and the base that is nearest to a contact between the base and the tab portions contains a region in which a density of the weld nugget is higher than that in another region of the boundary portion which is farther from the contact between the base and the tab portions than the part of a boundary portion between the projection and the base.

* * * * *